United States Patent
Wang et al.

(10) Patent No.: US 8,320,530 B2
(45) Date of Patent: Nov. 27, 2012

(54) METHOD, APPARATUS AND SYSTEM FOR REALIZING A MULTIMEDIA CALL

(75) Inventors: Sichen Wang, Shenzhen (CN); Hui Huang, Shenzhen (CN); Peng Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 877 days.

(21) Appl. No.: 12/434,857

(22) Filed: May 4, 2009

(65) Prior Publication Data
US 2010/0002849 A1    Jan. 7, 2010

(30) Foreign Application Priority Data

Jul. 3, 2008 (CN) .......................... 2008 1 0068414

(51) Int. Cl.
 *H04M 11/00* (2006.01)
 *H04L 12/66* (2006.01)
 *G06F 15/16* (2006.01)
(52) U.S. Cl. .......... 379/87; 370/254; 370/329; 370/352; 370/356; 370/409; 379/142.01; 379/201.01; 379/215.01; 379/251; 379/373.01; 455/412.1; 455/412.2; 455/455; 704/211; 704/500; 705/14.13; 707/722; 709/227
(58) Field of Classification Search .................. 370/259, 370/329, 409, 254, 352, 356, 403; 379/87, 379/88.13, 142.01, 201.01, 207.16, 372, 379/29.01, 215.01, 251, 252, 257, 373.01; 455/412.2, 455, 412.1; 704/500, 211; 709/227; 705/14.13; 707/722
See application file for complete search history.

(56) References Cited

U.S. PATENT DOCUMENTS

| | | | | |
|---|---|---|---|---|
| 5,724,407 A * | 3/1998 | Bruno et al. | ............... | 379/88.13 |
| 6,636,522 B1 * | 10/2003 | Perinpanathan et al. | ..... | 370/409 |
| 6,987,974 B1 * | 1/2006 | Mostafa et al. | ............... | 455/455 |
| 7,242,674 B2 * | 7/2007 | Jin | ............................... | 370/329 |
| 7,693,134 B2 * | 4/2010 | Batni et al. | .................... | 370/352 |
| 7,738,645 B2 * | 6/2010 | Kim | .......................... | 379/215.01 |

(Continued)

FOREIGN PATENT DOCUMENTS

EP     1 372 309 A1    12/2003
(Continued)

OTHER PUBLICATIONS

1st Office Action in corresponding Chinese Application No. 200810068414.2 (Jul. 21, 2011).

(Continued)

*Primary Examiner* — Gerald Gauthier
(74) *Attorney, Agent, or Firm* — Leydig, Voit & Mayer, Ltd.

(57) ABSTRACT

A method for realizing a multimedia call includes the following steps. A call request initiated by a calling terminal is received. An indication of the multimedia negotiation capability of the calling terminal is acquired, in which the indication of the multimedia negotiation capability identifies whether the terminal has the capability of supporting multiple multimedia negotiations or not. It is determined, according to the indication of the multimedia negotiation capability, whether the calling terminal has the capability of supporting multiple multimedia negotiations or not. A multimedia call connection is performed according to the multimedia negotiation capability of the calling terminal. It is determined, according to the factor whether the calling terminal has the capability of supporting multiple multimedia negotiations or not, how to perform the multimedia call connection, so as to flexibly realize the multimedia call connection accordingly.

20 Claims, 7 Drawing Sheets

U.S. PATENT DOCUMENTS

| | | | |
|---|---|---|---|
| 7,830,821 B2* | 11/2010 | Lin et al. | 370/254 |
| 7,912,198 B2* | 3/2011 | Zhang et al. | 379/207.16 |
| 8,046,356 B2* | 10/2011 | Schultz et al. | 707/722 |
| 8,085,929 B2* | 12/2011 | Subramaniam | 379/373.01 |
| 8,131,265 B2* | 3/2012 | Cheng et al. | 455/412.2 |
| 8,195,470 B2* | 6/2012 | Park et al. | 704/500 |
| 8,200,196 B2* | 6/2012 | David et al. | 455/412.1 |
| 8,259,622 B2* | 9/2012 | Lee et al. | 370/259 |
| 8,270,590 B2* | 9/2012 | Batni et al. | 379/257 |
| 2003/0233461 A1 | 12/2003 | Mariblanca-Nieves et al. | |
| 2007/0121595 A1* | 5/2007 | Batni et al. | 370/356 |
| 2007/0121657 A1* | 5/2007 | Boillot et al. | 370/403 |
| 2007/0127642 A1* | 6/2007 | Bae et al. | 379/88.13 |
| 2007/0127655 A1* | 6/2007 | Jung et al. | 379/142.01 |
| 2007/0127663 A1* | 6/2007 | Bae et al. | 379/201.01 |
| 2007/0127685 A1* | 6/2007 | Bae et al. | 379/251 |
| 2007/0127686 A1* | 6/2007 | Song et al. | 379/252 |
| 2007/0133760 A1* | 6/2007 | Cotignola et al. | 379/88.13 |
| 2007/0189474 A1* | 8/2007 | Cai | 379/142.01 |
| 2007/0211872 A1* | 9/2007 | Cai et al. | 379/142.01 |
| 2007/0291927 A1* | 12/2007 | Batni et al. | 379/372 |
| 2008/0045209 A1 | 2/2008 | Mo et al. | |
| 2008/0095326 A1* | 4/2008 | Qi et al. | 379/67.1 |
| 2008/0102800 A1 | 5/2008 | Cheng et al. | |
| 2008/0120176 A1* | 5/2008 | Batni et al. | 705/14 |
| 2008/0228472 A1* | 9/2008 | Park et al. | 704/211 |
| 2009/0161854 A1* | 6/2009 | Ku et al. | 379/207.16 |
| 2009/0164640 A1* | 6/2009 | Schultz et al. | 709/227 |
| 2009/0185665 A1* | 7/2009 | Chen | 379/29.01 |
| 2009/0304160 A1* | 12/2009 | McGary | 379/67.1 |
| 2010/0002849 A1* | 1/2010 | Wang et al. | 379/87 |
| 2010/0080149 A1* | 4/2010 | Lee et al. | 370/259 |
| 2010/0135473 A1* | 6/2010 | Dewing et al. | 379/88.13 |

FOREIGN PATENT DOCUMENTS

| | | |
|---|---|---|
| EP | 1 848 189 A1 | 10/2007 |
| WO | WO 2005/043926 A2 | 5/2005 |

OTHER PUBLICATIONS

Le Bodic, "Mobile Messaging Technologies and Services: SMS, EMS and MMS," 2005, John Wiley & Sons, Moscow, Russia.

"Dictionary of Foreign Words—About 10 000 words," 2005, St. Petersburg, Russia.

Efremova, T.F.,New Dictionary of the Russian language, Explanatory and word-formative dictionary, Moscow, publishing house "Russkiy Yazyk," 2002, vol. 2, pp. 653-654.

Office Action in Russian Application No. 2009125390/09(035300), mailed Aug. 27, 2010.

* cited by examiner

METHOD, APPARATUS AND SYSTEM FOR REALIZING A MULTIMEDIA CALL

CROSS-REFERENCE TO RELATED APPLICATIONS

This application claims priority to Chinese Patent Application No. 200810068414.2, filed Jul. 3, 2008, which is hereby incorporated herein reference in its entirety.

FIELD OF THE TECHNOLOGY

The disclosure relates to a communication field, in particular, to a method, an apparatus, and a system for playing a multimedia ring back tone.

BACKGROUND

The traditional ring back tone is a segment of customized music or voice subscribed to by a calling party, a called party, or a third party for being played to the calling party when the calling party calls the called party. As the 3rd generation mobile communication system and the next generation network (NGN) have been constructed, users have a video demand on the communication, and a multimedia ring back tone service has been proposed. The multimedia ring back tone is the extension of traditional ring back tone, which is a segment of customized multimedia subscribed to by the calling party, the called party, or the third party for being played to the calling party when the calling party calls the called party. The multimedia includes video, picture, and audio, etc. Recently, the network equipment is modified on the basis of the technical solution of the voice ring back tone, so as to realize a multimedia ring back tone service by enhancing the capability of the network equipment.

SUMMARY

Various embodiments of the disclosure are directed to a method, an apparatus, and a system for realizing a multimedia call, in which it is determined how to perform a multimedia call connection according to whether a calling terminal has the capability of supporting multiple multimedia negotiations or not, so as to flexibly perform the multimedia negotiation with the calling terminal according to the multimedia negotiation capability of the calling terminal, to play a ring back tone to the calling terminal, and to realize the multimedia call connection for the calling terminal and a called terminal.

In an embodiment, the disclosure provides a method for realizing a multimedia call, which includes the steps as follows.

A call request initiated by a calling terminal is received.

An indication of the multimedia negotiation capability of the calling terminal is acquired, in which the indication of the multimedia negotiation capability is adapted to identify whether the terminal has the capability of supporting multiple multimedia negotiations or not.

It is determined whether the calling terminal has the capability of supporting multiple multimedia negotiations or not according to the indication of multimedia negotiation capability.

A multimedia call connection is performed according to the multimedia negotiation capability of the calling terminal.

In an embodiment, the disclosure provides an apparatus for realizing a multimedia call, which includes a receiving unit, an acquiring unit, a determining unit, and an operating unit.

The receiving unit is adapted to receive a call request initiated by a calling terminal.

The acquiring unit is adapted to acquire an indication of the multimedia negotiation capability of the calling terminal, in which the indication of the multimedia negotiation capability is adapted to identify whether the terminal has the capability of supporting multiple multimedia negotiations or not.

The determining unit is adapted to determine, according to the indication of the multimedia negotiation capability, whether the calling terminal has the capability of supporting multiple multimedia negotiations or not.

The operating unit is adapted to perform a multimedia call connection according to the multimedia negotiation capability of the calling terminal.

In an embodiment, the disclosure provides a system for realizing a multimedia call, which includes a switching device.

The switching device is adapted to receive a call request initiated by a calling terminal; acquire an indication of the multimedia negotiation capability of the calling terminal, in which the indication of the multimedia negotiation capability is adapted to identify whether the terminal has the capability of supporting multiple multimedia negotiations or not; determine, according to the indication of the multimedia negotiation capability, whether the calling terminal has the capability of supporting multiple multimedia negotiations or not; and perform a multimedia call connection according to the multimedia negotiation capability of the calling terminal, in which the switching device realizes the multimedia call connection by setting up a connection between the calling terminal and a called terminal.

In the technical solution for realizing a multimedia call according to the disclosure, different multimedia call connection solutions can be adopted for the terminals having different multimedia negotiation capability, and thus, different terminal users are enabled to flexibly and conveniently enjoy the multimedia service, and to flexibly switch the network entity applications, thereby reducing the consumption of the network entity.

DETAILED DESCRIPTION

In order to make the technical solution of the disclosure more comprehensible, a detailed description of the disclosure is given as follows with reference to the accompanying drawings.

During the researching process, the inventor(s) finds out that, in order to play a multimedia ring back tone, a user terminal is required to have the capability of supporting multiple multimedia negotiations, but actually, not all the user terminals can have the capability of supporting multiple multimedia negotiations in one session. As for user terminals having different capabilities of multimedia negotiation, in order to play a multimedia ring back tone, there are different structural requirements on the network entities thereof. Therefore, the inventor(s) overcomes the problem that different user terminals are required to be supported by different network entities through a hybrid networking manner, and thus it is possible to select different solutions for playing a multimedia ring back tone according to different multimedia negotiation capabilities of the user terminals.

Figure 1:
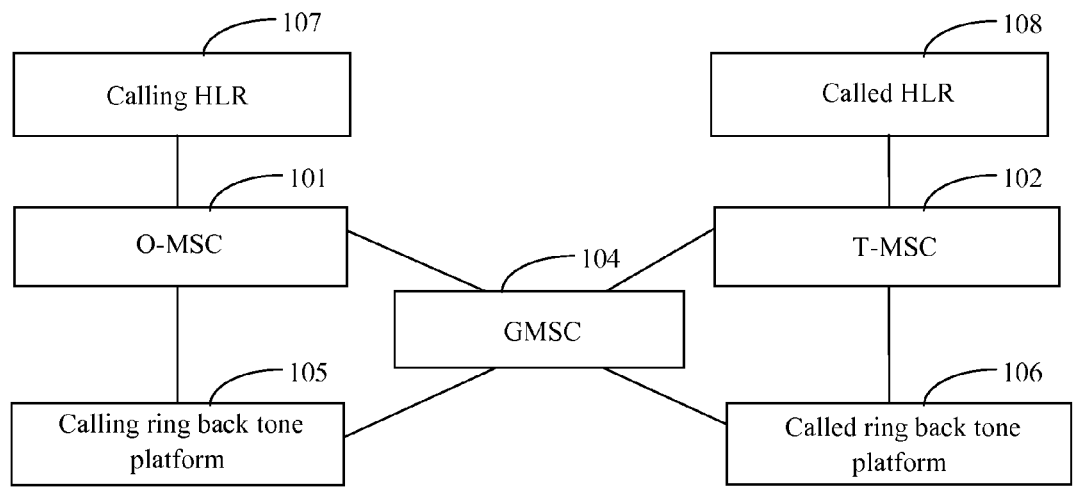
FIG. 1 is a schematic structural view of a system for realizing a multimedia call according to an embodiment of the disclosure.

In an embodiment, a system of the disclosure enables to perform a multimedia call connection. Referring to FIG. 1, the embodiment of the system of the disclosure may include the following network entities: an originating mobile switching center (O-MSC) 101, a terminating mobile switching center (T-MSC) 102, a calling home location register (HLR) 107 adapted to store an indication of multimedia negotiation capability of a calling terminal, a called HLR 108, a calling ring back tone platform 105, a called ring back tone platform 106, and the like. When the call connection is performed across different networks, the system further includes a gateway mobile switching center (GMSC) 104, so as to realize the call connection across different networks through the GMSC.

Figure 2:
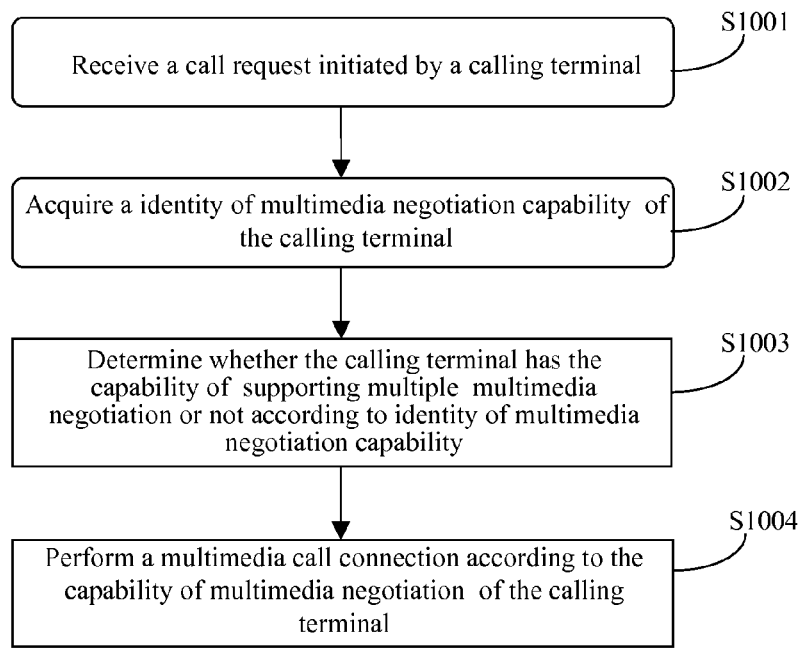
FIG. 2 is a signaling flow chart of a method for realizing a multimedia call according to an embodiment of the disclosure.

In an embodiment, the disclosure provides a method for realizing a multimedia call. Referring to FIG. 2, the method includes the steps as follows.

In S1001, a call request initiated by a calling terminal is received.

In S1002, an indication of multimedia negotiation capability of the calling terminal is acquired, in which the indication of multimedia negotiation capability is adapted to identify whether the terminal has the capability of supporting multiple multimedia negotiations or not.

In S1003, it is determined, according to the indication of multimedia negotiation capability, whether the calling terminal has the capability of supporting multiple multimedia negotiations or not.

In S1004, a multimedia call connection is performed according to a multimedia negotiation capability of the calling terminal.

The above steps may be realized by a switching device, and the switching device may be the O-MSC 101 or T-MSC 102, in which the O-MSC 101 or the T-MSC 102 determines whether the calling terminal has the capability of supporting multiple multimedia negotiations or not, and determines, according to different capabilities of multimedia negotiation of the calling terminals, how to perform the multimedia call connection. If it is a cross-network call, the switching device may be the GMSC 104, so that the call connection is performed through the GMSC 104. The GMSC 104 determines whether the calling terminal has the capability of supporting multiple multimedia negotiations or not, and determines, according to different capabilities of multimedia negotiation of the calling terminals, how to perform the call connection. The multimedia negotiation capability refers to a capability of the calling terminal in performing the multiple multimedia negotiation, in which the so-called multiple multimedia negotiations usually refers to two or more than two multimedia negotiations. The switching device receives the call request initiated by the calling terminal which means the switching device may directly receive a message (e.g., a SETUP message) initiated by the calling terminal, or receive through an intermediate node a message (e.g., an initial address message (IAM)) for calling a called terminal initiated by the calling terminal. For example, the GMSC 104 receives the call request for calling the called terminal initiated by the calling terminal through the O-MSC 101, which is realized by sending an IAM message to the GMSC 104 through the O-MSC 101. The indication of multimedia negotiation capability may be carried in the call request to be sent to the switching device from the terminal in real time. For example, the indication of multimedia negotiation capability is carried in the SETUP message initiated by the calling terminal. Alternatively, the indication of multimedia negotiation capability is carried to the switching device through the call request sent through an intermediate node, for example, the indication of multimedia negotiation capability is carried in the IAM message sent from the O-MSC, and thus the indication of multimedia negotiation capability of the calling terminal may be acquired from the call request. The switching device may acquire the indication of multimedia negotiation capability of the terminal from a data storage device in the network, and the data storage device store the indication of multimedia negotiation capability of the terminal. For example, terminal types and corresponding terminal capabilities may be stored in a user agent profile (UAProf) entity, where the terminal capability includes whether supporting the multiple H.245 negotiation or not. The indication of multimedia negotiation capability of the terminal may be acquired from the HLR. The capability of the calling terminal may be stored in the HLR, the capability of the calling terminal stored in the HLR is synchronously updated to a visitor location register (VLR) during a location update process. Thus, the O-MSC may acquire the indication of multimedia negotiation capability of the calling terminal from the VLR, and carries the indication of multimedia negotiation capability in the IAM message and sends the IAM message to the next node, for example, the GMSC or the T-MSC, when it is necessary.

In the embodiment of the method, the multimedia call connection is performed through the following manners.

In the first manner, when it is determined, according to the indication of multimedia negotiation capability, that the calling terminal has the capability of supporting multiple multimedia negotiations. The switching device connects to a ring back tone platform, the calling terminal and the ring back tone platform complete a multimedia negotiation, and the ring back tone platform plays a multimedia ring back tone to the calling terminal. After a called terminal answers the call, the calling terminal release the connection to the ring back tone platform, the calling terminal and the called terminal complete a multimedia negotiation, and the calling terminal and the called terminal perform a multimedia conversation. The calling terminal has the capability of supporting multiple multimedia negotiations, so that the calling terminal performs the multimedia negotiation with the ring back tone platform and the called terminal respectively, and thus it is not necessary to bridge the connection between the calling terminal and the called terminal by using network equipment. In this manner, the switching device sends an IAM message to the ring back tone platform, in which the IAM message carries Prefix+ called mobile station international integrated services digital network (ISDN) number (MSISDN), and the Prefix instructs to play the ring back tone.

In the second manner, when it is determined, according to the indication of multimedia negotiation capability, that the calling terminal does not have the capability of supporting multiple multimedia negotiations, the switching device connects to the ring back tone platform, the ring back tone platform and the calling terminal complete a multimedia negotiation, and the ring back tone platform plays a multimedia ring back tone to the calling terminal. After the called terminal answers the call, the ring back tone platform and the called terminal complete a multimedia negotiation so that the calling terminal and the called terminal perform a multimedia conversation. The calling terminal can only perform the one multimedia negotiation, so that it needs to bridge the connection between the calling terminal and the called terminal by using network equipment. In this implementation manner, the connection between the calling terminal and the called terminal is bridged through the ring back tone platform.

In the third manner, when it is determined, according to the indication of multimedia negotiation capability, that the calling terminal does not have the capability of supporting multiple multimedia negotiations, the switching device connects to the ring back tone platform, and completes multimedia negotiation with the calling terminal and the ring back tone platform respectively, and the ring back tone platform plays a multimedia ring back tone to the calling terminal. After the called terminal answers the call, the switching device and the called terminal complete a multimedia negotiation, so that the calling terminal and the called terminal perform a multimedia conversation, and the connection between calling terminal and the ring back tone platform is released. The calling terminal can only perform the one multimedia negotiation, so it needs to bridge the connection between the calling terminal and the called terminal by using the network equipment. In this implementation manner, the connection between the calling terminal and the called terminal is bridged through the switching device.

In the fourth manner, when it is determined, according to the indication of multimedia negotiation capability, that the calling terminal does not have the capability of supporting multiple multimedia negotiations, the switching device connects to the ring back tone platform, so that the ring back tone platform plays an audio ring back tone without performing a multimedia negotiation. Alternatively, the calling terminal plays a multimedia ring tone stored in the calling terminal itself, and the switching device directly connects to the called terminal. After the called terminal answers the call, the calling terminal and the called terminal complete a multimedia negotiation, and the calling terminal and the called terminal perform a multimedia conversation. The calling terminal can only perform one multimedia negotiation, so the ring back tone platform plays an audio ring back tone to the calling terminal. The calling terminal and the called terminal only perform one multimedia negotiation, so that the conversation between the calling terminal and the called terminal is realized.

Through the technical solution for realizing a multimedia call according to the embodiment of the disclosure, different multimedia call connection solutions can be adopted for the terminals having different capabilities of multimedia negotiation, so that different terminal users can flexibly and conveniently enjoy the multimedia service, and can flexibly switch the network entity applications, thereby reducing the consumption of the network entity.

Figure 3:
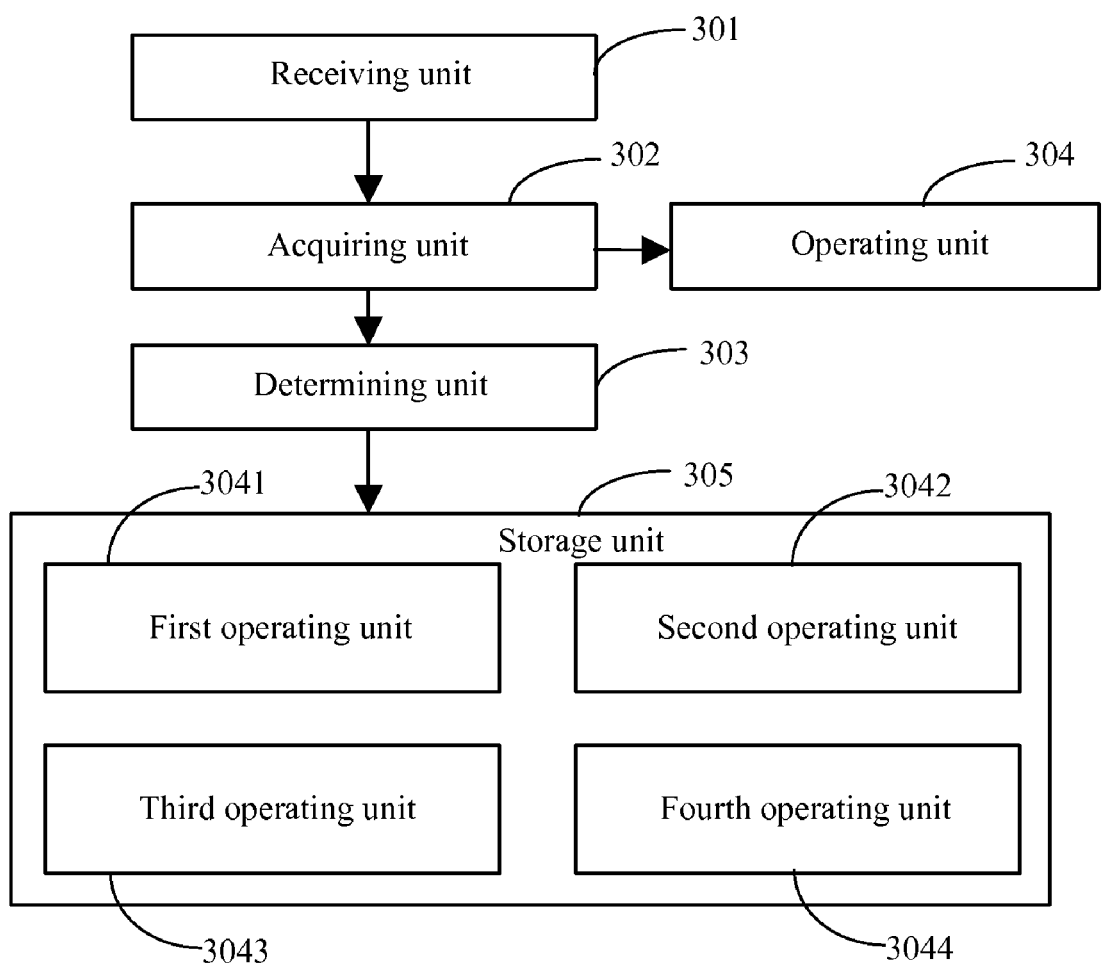
FIG. 3 is a schematic structural view of an apparatus for realizing a multimedia call according to an embodiment of the disclosure.

In an embodiment, the disclosure further provides an apparatus for realizing a multimedia call. Referring to FIG. 3, the apparatus includes: a receiving unit 301, adapted to receive a call request initiated by a calling terminal; an acquiring unit 302, adapted to acquire an indication of the multimedia negotiation capability of the calling terminal, in which the indication of the multimedia negotiation capability is adapted to identify whether the terminal has the capability of supporting multiple multimedia negotiations or not; a determining unit 303, adapted to determine, according to the indication of the multimedia negotiation capability, whether the calling terminal has the capability of supporting multiple multimedia negotiations or not; and an operating unit 304, adapted to perform a multimedia call connection according to the multimedia negotiation capability of the calling terminal.

In the embodiment of the apparatus, the indication of the multimedia negotiation capability may be carried in the call request, and the acquiring unit 302 may extract the indication of the multimedia negotiation capability of the calling terminal from the call request. The acquiring unit 302 may further acquire the indication of the multimedia negotiation capability of the terminal from a data storage device which stores the indication of the multimedia negotiation capability of the terminal. In another embodiment of the apparatus, the apparatus further includes a storage unit 305, adapted to store the indication of the multimedia negotiation capability of the calling terminal, and thus the acquiring unit 302 acquires the indication of the multimedia negotiation capability of the calling terminal from the storage unit 305.

In the embodiment of the apparatus, the operating unit 304 further includes a first operating unit 3041. The first operating unit 3041 is adapted to connect a ring back tone platform when the determining unit 303 determines that the calling terminal has the capability of supporting multiple multimedia negotiations, to enable the ring back tone platform and the calling terminal to complete a multimedia negotiation. The ring back tone platform plays a multimedia ring back tone to the calling terminal. And the calling terminal releases the connection with the ring back tone platform after a called terminal answers the call. The calling terminal and the called terminal complete a multimedia negotiation to enable the calling terminal and the called terminal to perform a multimedia conversation. The operating unit further includes a second operating unit 3042. The second operating unit 3042 is adapted to connect the ring back tone platform when the determining unit 303 determines that the calling terminal has the capability of supporting multiple multimedia negotiations, to enable the ring back tone platform and the calling terminal to complete a multimedia negotiation. The ring back tone platform plays a multimedia ring back tone to the calling terminal and the ring back tone platform and a called terminal complete a multimedia negotiation after the called terminal answers the call to enable the calling terminal and the called terminal to perform the multimedia conversation. The operating unit 304 further includes a third operating unit 3043. The third operating unit 3043 is adapted to connect the ring back tone platform, complete a multimedia negotiation with the calling terminal and the ring back tone platform respectively to enable the ring back tone platform to play a multimedia ring back tone to the calling terminal, when the determining unit 303 determines that the calling terminal does not have the capability of supporting multiple multimedia negotiation. And after the called terminal answers the call. The third operating unit 3043 completes a multimedia negotiation with a called terminal to enable the calling terminal and the called terminal to perform a multimedia conversation, and releases the connection with the ring back tone platform. The operating unit 304 further includes a fourth operating unit 3044. The fourth operating unit 3044 is adapted to connect a called terminal when the determining unit 303 determines that the calling terminal does not have the capability of supporting multiple multimedia negotiations, so that the calling terminal and the called terminal complete a multimedia negotiation and the calling terminal and the called terminal perform a multimedia conversation. The operating unit 304 in this embodiment includes at least one unit selected from the first operating unit 3041, the second operating unit 3042, the third operating unit 3043, and the fourth operating unit 3044.

In the above embodiments of the apparatus, the apparatus for realizing a multimedia call may be set in the O-MSC, the T-MSC, or the GMSC.

Figure 8:
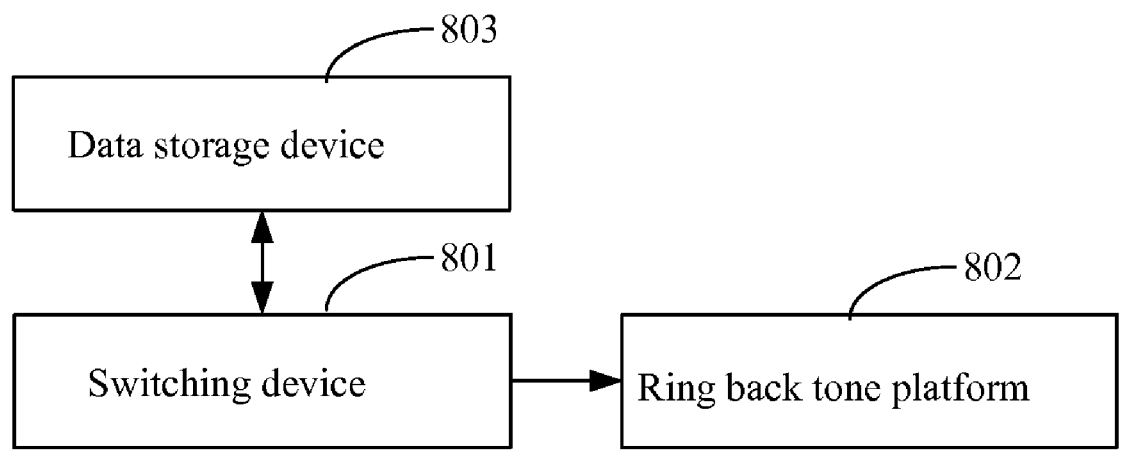
FIG. 8 is a structural flow chart of a system for realizing a multimedia call according to an embodiment of the disclosure.

In an embodiment, the disclosure further provides a system for realizing a multimedia call. Referring to FIG. 8, the system includes a switching device 801. The switching device 801 is adapted to receive a call request initiated by a calling terminal, acquire an indication of the multimedia negotiation capability of the calling terminal, in which the indication of the multimedia negotiation capability is adapted to identify whether the terminal has the capability of supporting multiple multimedia negotiations or not. The switching device 801 determines, according to the indication of the multimedia negotiation capability, whether the calling terminal has the capability of supporting multiple multimedia negotiations or not, and perform a multimedia call connection according to the multimedia negotiation capability of the calling terminal. The switching device 801 realizes the multimedia call connection by setting up a conversion connection between the calling terminal and the called terminal.

In the embodiment of the system, the system further includes a ring back tone platform 802. When it is determined, according to the indication of the multimedia negotiation capability, that the calling terminal has the capability of supporting multiple multimedia negotiations, the switching device 801 connects to the ring back tone platform 802. The ring back tone platform 802 is adapted to perform a multimedia negotiation with the calling terminal, and play a multimedia ring back tone to the calling terminal. Furthermore, after a called terminal answers the call, the switching device 801 releases the connection with the ring back tone platform 802 to enable the calling terminal and the called terminal to complete a multimedia negotiation and enable the calling terminal and the called terminal to perform a multimedia conversation.

In the embodiment of the system, the system further includes a ring back tone platform 802. When it is determined, according to the indication of the multimedia negotiation capability, that the calling terminal does not support the capability of multiple multimedia negotiations, the switching device 801 connects to the ring back tone platform 802. The ring back tone platform 802 is adapted to perform a multimedia negotiation with the calling terminal, play a multimedia ring back tone to the calling terminal, and perform a multimedia negotiation with the called terminal after the called terminal answers the call, so that the calling terminal and the called terminal perform a multimedia conversation.

In the embodiment of the system, the system further includes a ring back tone platform 802. When it is determined, according to the indication of the multimedia negotiation capability, that the calling terminal does not support the capability of multiple multimedia negotiations, the switching device 801 connects to the ring back tone platform 802, and completes a multimedia negotiation with the calling terminal and the ring back tone platform 802 respectively. The ring back tone platform 802 is adapted to perform a multimedia negotiation with the switching device, and play a multimedia ring back tone to the calling terminal. After the called terminal answers the call, the switching device 801 performs a multimedia negotiation with the called terminal, and releases the connection with the ring back tone platform 802, so that the calling terminal and the called terminal perform a multimedia conversation.

In the embodiment of the system, the performing the multimedia call connection further includes that, when it is determined, according to the indication of the multimedia negotiation capability, that the calling terminal does not support the capability of multiple multimedia negotiations, the switching device 801 connects to the called terminal, enables the calling terminal and the called terminal to complete a multimedia negotiation after the called terminal answers the call, so that the calling terminal and the called terminal perform a multimedia conversation.

In the embodiment of the system, the indication of the multimedia negotiation capability may be carried in the call request, and the switching device 801 may extract the indication of the multimedia negotiation capability of the calling terminal from the call request. Alternatively, the indication of the multimedia negotiation capability may be stored in a data storage device 803. In the embodiment of the system, the system further includes a data storage device 803, adapted to store the indication of the multimedia negotiation capability of the terminal, and thus the switching device 801 acquires the indication of the multimedia negotiation capability of the calling terminal from the data storage device 803. The data storage device 803 may be the UAProf entity or HLR.

In another embodiment of the system, the calling terminal is adapted to play a multimedia ring back tone before the called terminal answers the call.

In the embodiment of the system, the ring back tone platform has the connection functions of the above different embodiments at the same time, which flexibly plays the ring back tone, and performs the multimedia call connection according to the multimedia negotiation capability of the calling terminals.

Figure 4:
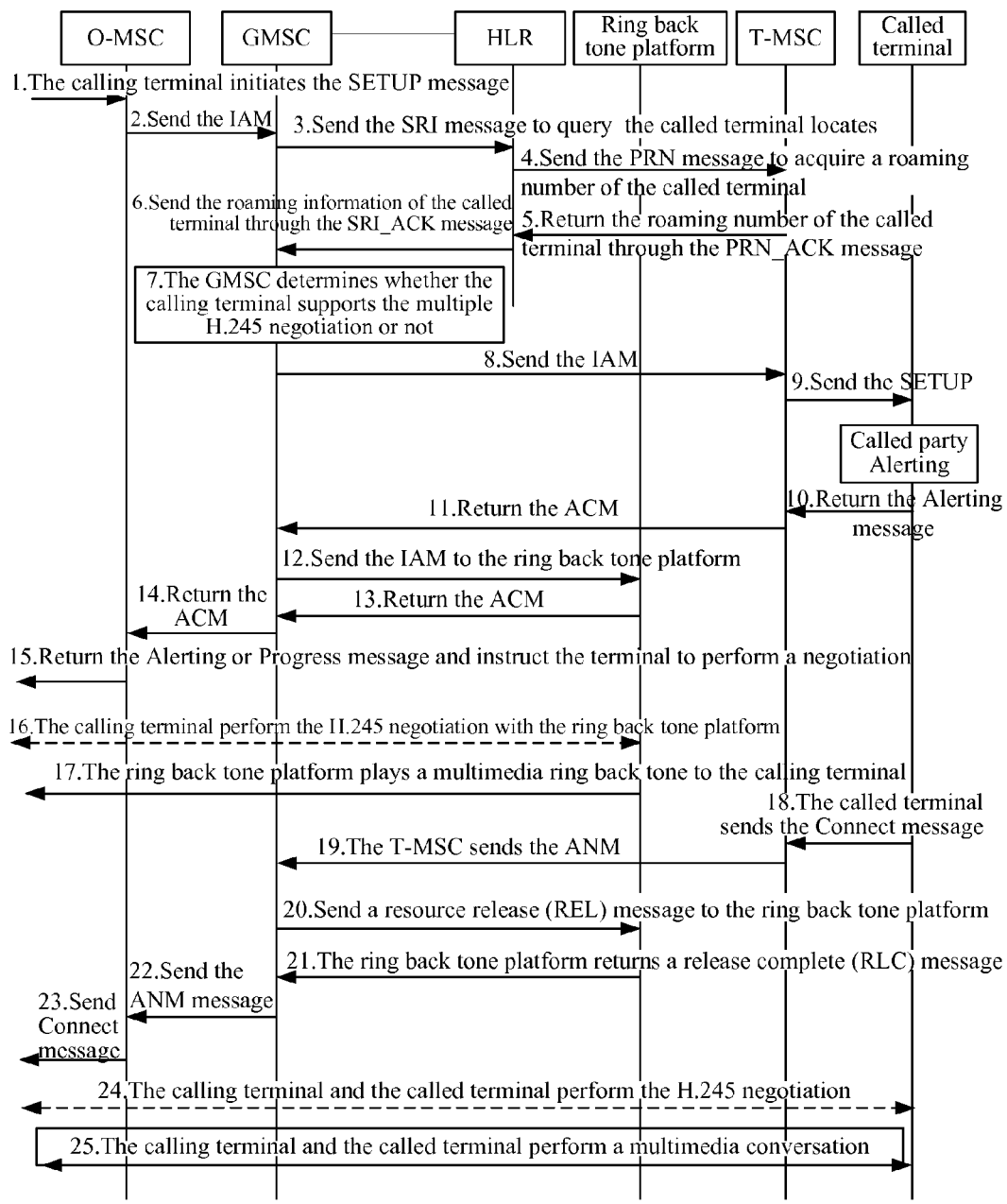
FIG. 4 is a signaling flow chart of a method for realizing a multimedia call according to an embodiment of the disclosure.

FIG. 4 is an embodiment of a method of the disclosure. When a calling terminal initiates a multimedia call connection to a called terminal, the method serves as a solution for playing a multimedia ring back tone and realizing a multimedia call connection. In this embodiment, the involved network structure includes the following entities: an O-MSC, a T-MSC, a GMSC, an HLR, and a ring back tone platform. The flow of the method for realizing a multimedia call connection is described as follows.

In Step 1, the calling terminal dials a number of the called terminal, and initiates a SETUP message to the O-MSC, in which the SETUP message carries an indication of the multimedia negotiation capability of the calling terminal, and the indication of the multimedia negotiation capability is adapted to identify whether the calling terminal has the capability of supporting multiple H.245 multimedia negotiations.

The indication of the multimedia negotiation capability may be identified and carried in a spare field in 5a of a bearer capability (BC) information element (IE) in the SETUP message, in which one or more bits may be adopted to carry the indication of the multimedia negotiation capability, for example, '011' in 1 to 3 bit positions is adapted to identify that the terminal has the capability of supporting multiple H.245 negotiations. If it is not '011' in 1 to 3 bit positions, it indicates that the terminal does not support the multiple H.245 negotiations. In this embodiment, it is assumed that the calling terminal supports the two H.245 negotiations in one session.

In Step 2, the O-MSC sends an IAM to a GMSC according to the SETUP message received from the calling terminal, in which the IAM message carries the indication of the multimedia negotiation capability of the calling terminal, and the indication of the multimedia negotiation capability is adapted to identify whether the calling terminal supports a H.245 negotiation or not.

The indication of the multimedia negotiation capability may be carried in an optional forward call indicator (OFIC) in the IAM message sent from the O-MSC, and one or more bits in G-D in the OFCI may be adapted to carry the indication of the multimedia negotiation capability.

The indication of the multimedia negotiation capability may be carried in a new IE extended in the IAM message, and the name of the IE may be customized, for example, a customized alerting tone indicator, and the length of the IE may be one or more bytes. If the IE is one byte, the indication may be defined by any one or more bits.

In Step 3, after receiving the IAM sent from the O-MSC, the GMSC sends a send routing information (SRI) message to the HLR to query current location information of the called terminal.

In Step 4, the HLR, according to the SRI message received from the GMSC, sends a provided roaming number (PRN) message for acquiring a current roaming number of the called terminal to a T-MSC to which the called terminal belongs.

In Step 5, the T-MSC receives the PRN message from the HLR, and returns a roaming number of the called terminal to the HLR through a provided roaming number acknowledge (PRN_ACK) response message.

In Step 6, the HLR sends the roaming information of the called terminal acquired from the T-MSC to the GMSC through a send routing information acknowledge (SRI_ACK) response message, and sets an SS_CODE field in the SRI_ACK message to a specific value, in which the specific value indicates that the user of the called terminal activates a multimedia ring back tone service. In this embodiment, for example, a multimedia ring back tone service subscribed by the user of the called terminal is mainly played, and it is also applicable to a situation of playing a multimedia ring back tone service subscribed by the user of the calling terminal.

In Step 7, the GMSC determines, according to the SRI_ACK message, that the called terminal has subscribed the multimedia ring back tone service. The GMSC determines, according to the factor whether the calling terminal supports the multiple H.245 negotiations, how to play a multimedia ring back tone to the calling terminal, and then performs a multimedia call connection. In this embodiment, it is assumed that the calling terminal supports the two H.245 negotiations, that is, the calling terminal can perform the multiple multimedia negotiations, so that the multimedia ring back tone is played through a multimedia negotiation between the calling terminal and the ring back tone platform, and a multimedia conversation between the calling terminal and the called terminal is realized through a multimedia negotiation between the calling terminal and the called terminal.

In Step 8, the GMSC sends the IAM to the T-MSC.

In Step 9, the T-MSC sends the SETUP message to the called terminal.

In Step 10, the called terminal returns an Alerting ringing message to the T-MSC, and the called terminal rings.

In Step 11, the T-MSC returns an address complete message (ACM) to the GMSC according to the ringing message.

In Step 12, the GMSC sends the IAM to the ring back tone platform, and the called number carried in the IAM may be "Prefix+ called MSISDN", in which the Prefix instructs to play a ring back tone to the calling terminal.

In Step 13, the ring back tone platform returns the ACM to the GMSC, and gets ready to play the multimedia ring back tone to the calling terminal. In this step, the ring back tone platform determines the multimedia ring back tone to be played according to information received from the GMSC.

In Step 14, the GMSC returns the ACM to the O-MSC.

In Step 15, the O-MSC returns the Alerting or Progress message to the calling terminal, so as to instruct the terminal to perform an H.245 negotiation.

In Step 16, the calling terminal performs the H.245 negotiation with the ring back tone platform. And in the calling process, the calling terminal performs the first H.245 negotiation.

In Step 17, after the negotiation is completed, the ring back tone platform plays the multimedia ring back tone to the calling terminal.

In Step 18, the called terminal answers the call initiated by the calling terminal, and sends a CONNECT message to the T-MSC.

In Step 19, the T-MSC sends an answer message (ANM) to the GMSC.

In Step 20, after receiving the ANM from the T-MSC, the GMSC disconnects a bearer connection with the ring back tone platform, and sends a resource release (REL) message to the ring back tone platform.

In Step 21, after releasing the resource, the ring back tone platform returns a release complete (RLC) message to the O-MSC.

In Step 22, the GMSC sends the ANM to the O-MSC, so as to indicate that the called terminal has answered the call.

In Step 23, the O-MSC sends the CONNECT message to the calling terminal, so as to notify the calling terminal and the called terminal to perform the H.245 negotiation.

In Step 24, the calling terminal and the called terminal perform the H.245 negotiation, which is the second multimedia negotiation of the calling terminal in the calling flow.

In Step 25, after the calling terminal completes the multimedia negotiation with the called terminal, a conversation between the calling terminal and the called terminal is realized.

The above embodiment is the connection process for realizing the cross-network multimedia call. If a multimedia call does not involve the cross-network call situation, the call connection thereof may be processed by a mobile switching center without being processed by the GMSC, in which the mobile switching center may be an O-MSC or a T-MSC.

Figure 5:
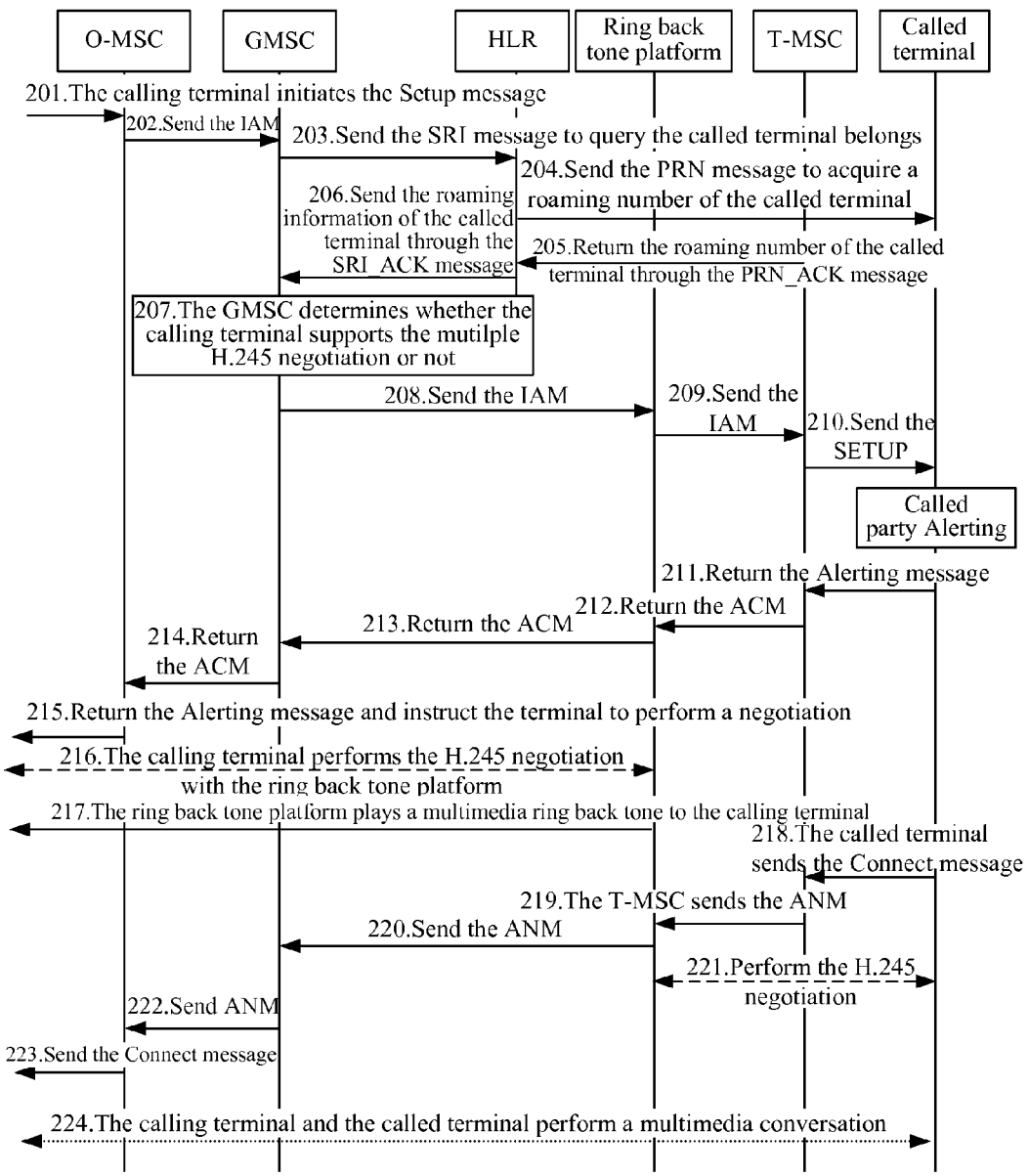
FIG. 5 is a signaling flow chart of a method for realizing a multimedia call according to an embodiment of the disclosure.

FIG. 5 shows a method for realizing a multimedia call connection according to another embodiment of the disclosure. In this embodiment, it is assumed that the calling terminal does not have the capability of supporting multiple multimedia negotiations. In this case, when the GMSC determines that the calling terminal does not have the capability of supporting multiple multimedia negotiations, the ring back tone platform is required for bridging a connection between the calling terminal and the called terminal after the ring back tone platform plays the ring back tone to the calling terminal, thereby realizing the conversation between the calling terminal and the called terminal. The detailed flow is described as follows.

In Step 201, a calling terminal dials a number of a called terminal, and initiates a SETUP message to an O-MSC, in which the SETUP message carries an indication of the multimedia negotiation capability of the calling terminal, and the indication of the multimedia negotiation capability is adapted to identify whether the calling terminal has the capability of supporting multiple H.245 multimedia negotiations or not. The indication of the multimedia negotiation capability may be represented through a spare field in 5a of a BC IE in the SETUP. In this embodiment, it is assumed that the calling terminal does not support the two H.245 negotiations.

In Step 202, the O-MSC sends an IAM to a GMSC, in which the IAM carries the indication of the multimedia negotiation capability of the calling terminal, and the indication of the multimedia negotiation capability is adapted to identify whether the calling terminal has the capability of supporting multiple H.245 multimedia negotiations or not. The indication of the multimedia negotiation capability may be carried in the IAM in the manner as described in the above embodiment.

In Step 203, the GMSC sends a SRI message to an HLR to query current location information of the called terminal.

In Step 204, according to the SRI message received from the GMSC, the HLR sends a PRN message for acquiring a current roaming number of the called terminal to a T-MSC to which the called terminal belongs.

In Step 205, the T-MSC receives the PRN message from the HLR, and returns a roaming number of the called terminal to the HLR through a PRN_ACK response message.

In Step 206, the HLR sends the roaming information of the called terminal acquired from the T-MSC to the GMSC through an SRI_ACK response message, and sets an SS_CODE field in the SRI_ACK response message to a specific value, in which the specific value indicates that a user of the called terminal activates a multimedia ring back tone service.

In Step 207, the GMSC determines, according to the SRI_ACK response message, that the called terminal has subscribed the multimedia ring back tone service. The GMSC determines, according to the factor whether the calling terminal supports the multiple H.245 negotiations, an appropriate solution for playing a multimedia ring back tone and a solution for realizing a conversation connection between the calling terminal and the called terminal. In this embodiment, the calling terminal does not support the two H.245 negotiations, so that the ring back tone platform plays the multimedia ring back tone to the calling terminal after performing a multimedia negotiation with the calling terminal, and the ring back tone platform is adopted for bridging a conversation connection between the calling terminal and the called terminal.

In Step 208, the GMSC sends the IAM to the ring back tone platform, and the IAM carries Prefix+ called MSISDN, in which the Prefix instructs to play a ring back tone. In addition, the IAM further carries a mobile station roaming number (MSRN) of the called terminal.

In Step 209, the ring back tone platform sends the IAM to the T-MSC.

In Step 210, the T-MSC sends the SETUP message to the called terminal.

In Step 211, the called terminal returns an Alerting ringing message to the T-MSC, and the called terminal rings.

In Step 212, the T-MSC returns the ACM to the ring back tone platform.

In Step 213, the ring back tone platform sends the ACM to the GMSC.

In Step 214, the GMSC returns the ACM to the O-MSC.

In Step 215, the O-MSC sends the Alerting or Progress message to the calling terminal, so as to instruct the calling terminal to perform an H.245 negotiation with the ring back tone platform.

In Step 216, the calling terminal and the ring back tone platform perform the H.245 multimedia negotiation.

In Step 217, after the multimedia negotiation is completed, the ring back tone platform plays the multimedia ring back tone to the calling terminal.

In Step 218, the called terminal answers the call initiated by the calling terminal, and sends a CONNECT message to the T-MSC.

In Step 219, the T-MSC sends the ANM to the ring back tone platform.

In Step 220, the ring back tone platform sends the ANM to the GMSC.

In Step 221, the ring back tone platform and the called terminal perform the H.245 multimedia negotiation.

In Step 222, the GMSC sends the ANM to the O-MSC, so as to indicate that the called terminal has answered the call.

In Step 223, the O-MSC sends the CONNECT message to the calling terminal.

In Step 224, a conversation between the calling terminal and the called terminal is realized.

Figure 6:
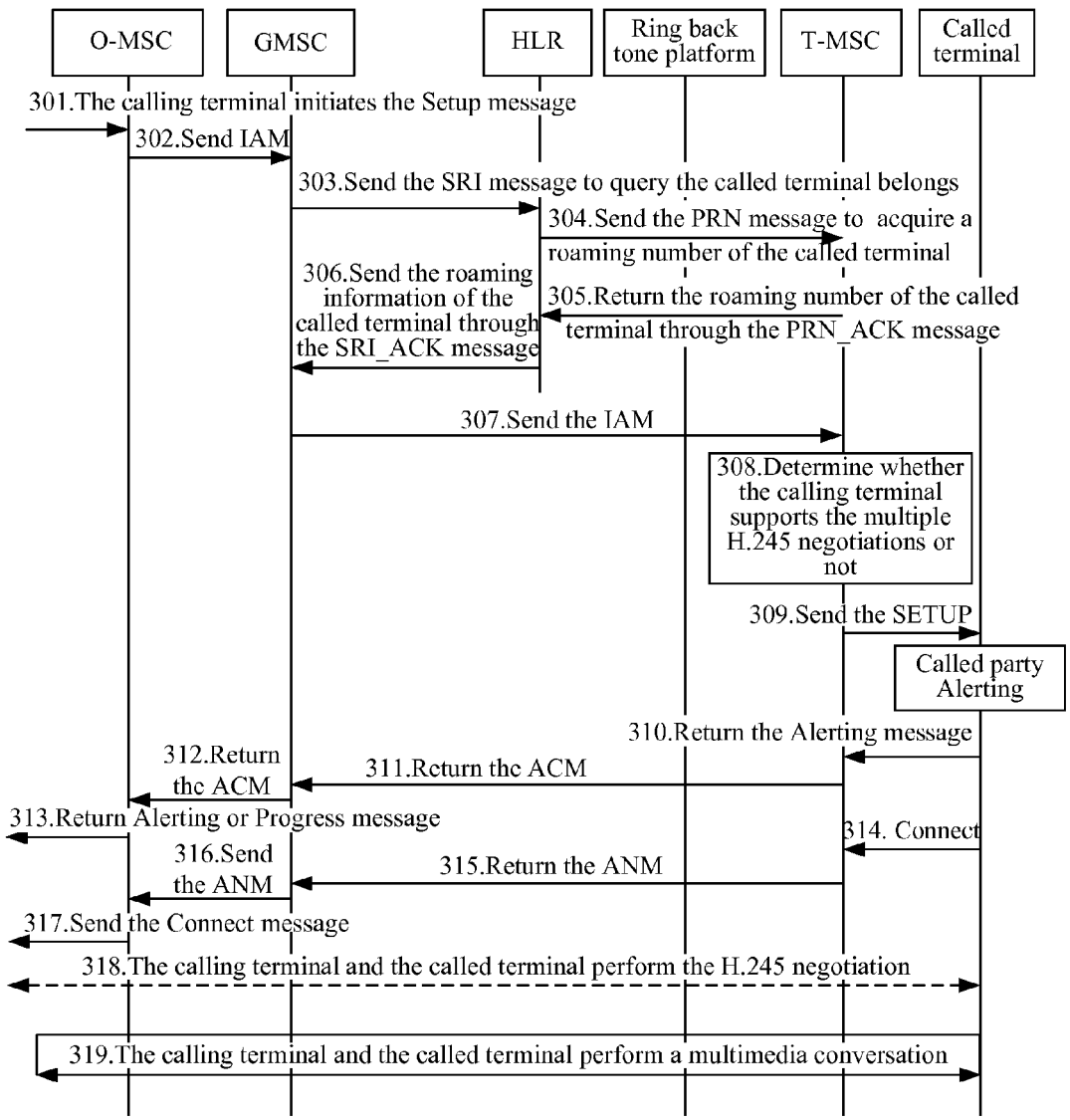
FIG. 6 is a signaling flow chart of a method for realizing a multimedia call according to an embodiment of the disclosure.

FIG. 6 shows a method for realizing a multimedia call connection according to another embodiment of the disclosure. In this embodiment, the T-MSC determines whether the calling terminal has the capability of supporting multiple multimedia negotiations, and determines, according to the indication of multimedia negotiation capability of the calling terminal, whether to play a multimedia ring back tone and realize a multimedia call connection for the calling terminal or not. The detailed flow for the call connection process is described as follows.

In Step 301, the calling terminal dials a number of the called terminal, and initiates a SETUP message to an O-MSC, in which the SETUP message carries an indication of the multimedia negotiation capability of the calling terminal, and the indication of the multimedia negotiation capability is adapted to identify whether the calling terminal has the capability of supporting multiple H.245 multimedia negotiations or not. The indication of the multimedia negotiation capability may be represented through a spare field in 5a of the BC IE in the SETUP message. In this embodiment, it is assumed that the calling terminal does not support the two H.245 negotiations.

In Step 302, the O-MSC sends an IAM to a GMSC, and the IAM carries the indication of the multimedia negotiation capability of the calling terminal, and the indication of the multimedia negotiation capability is adapted to identify whether the calling terminal has the capability of supporting multiple H.245 multimedia negotiations or not. The indication of the multimedia negotiation capability may be carried in the manner as described in the above embodiment.

In Step 303, the GMSC sends an SRI message to an HLR to query current location information of the called terminal.

In Step 304, according to the SRI message received from the GMSC, the HLR sends a PRN message for acquiring a current roaming number of the called terminal to a T-MSC to which the called terminal belongs.

In Step 305, the T-MSC receives the PRN message from the HLR, and returns a roaming number of the called terminal to the HLR through a PRN_ACK response message.

In Step 306, the HLR sends the roaming information of the called terminal, e.g., MSRN, acquired from the T-MSC to the GMSC through an SRI_ACK response message.

In Step 307, the GMSC sends the IAM to the T-MSC, in which the IAM carries the indication of the multimedia negotiation capability of the calling terminal, and the indication of the multimedia negotiation capability is adapted to identify whether the calling terminal has the capability of supporting multiple H.245 multimedia negotiations or not. The indication of the multimedia negotiation capability may be carried in the manner as described in the above embodiment.

In Step 308, the T-MSC acquires a ring back tone service subscription information of the called terminal, and determines that the called terminal is a subscriber for a multimedia ring back tone service. The T-MSC determines, according to the factor that the calling terminal does not have the capability of supporting multiple H.245 multimedia negotiations, not to play a multimedia ring back tone to the calling terminal. For example, if the T-MSC determines to play a conventional voice ring back tone to the calling terminal, the T-MSC sets up a connection with the ring back tone platform after Step 310, and then the ring back tone platform determines the ring back tone to be played. Once the calling terminal receives the Alerting message, the ring back tone is played to the calling terminal. The T-MSC may also not play any ring back tone to the calling terminal.

In Step 309, the T-MSC sends the SETUP message to the called terminal.

In Step 310, the called terminal returns the Alerting ringing message to the T-MSC, and the called terminal rings.

In Step 311, the T-MSC returns an ACM to the GMSC.

In Step 312, the GMSC returns the ACM to the O-MSC.

In Step 313, the O-MSC returns the Alerting or Progress message to the calling terminal.

In Step 314, the called terminal answers the call initiated by the calling terminal, and sends a CONNECT message to the T-MSC.

In Step 315, the T-MSC sends an ANM to the GMSC.

In Step 316, after receiving the ANM sent from the T-MSC, the GMSC sends the ANM to the O-MSC, so as to notify that the called terminal has answered the call.

In Step 317, the O-MSC sends the CONNECT message to the calling terminal, so as to notify the calling terminal to perform the H.245 negotiation with the called terminal.

In Step 318, the calling terminal and the called terminal perform the H.245 negotiation.

In Step 319, after the calling terminal completes the multimedia negotiation with the called terminal, a conversation between the calling terminal and the called terminal is realized.

Figure 7:
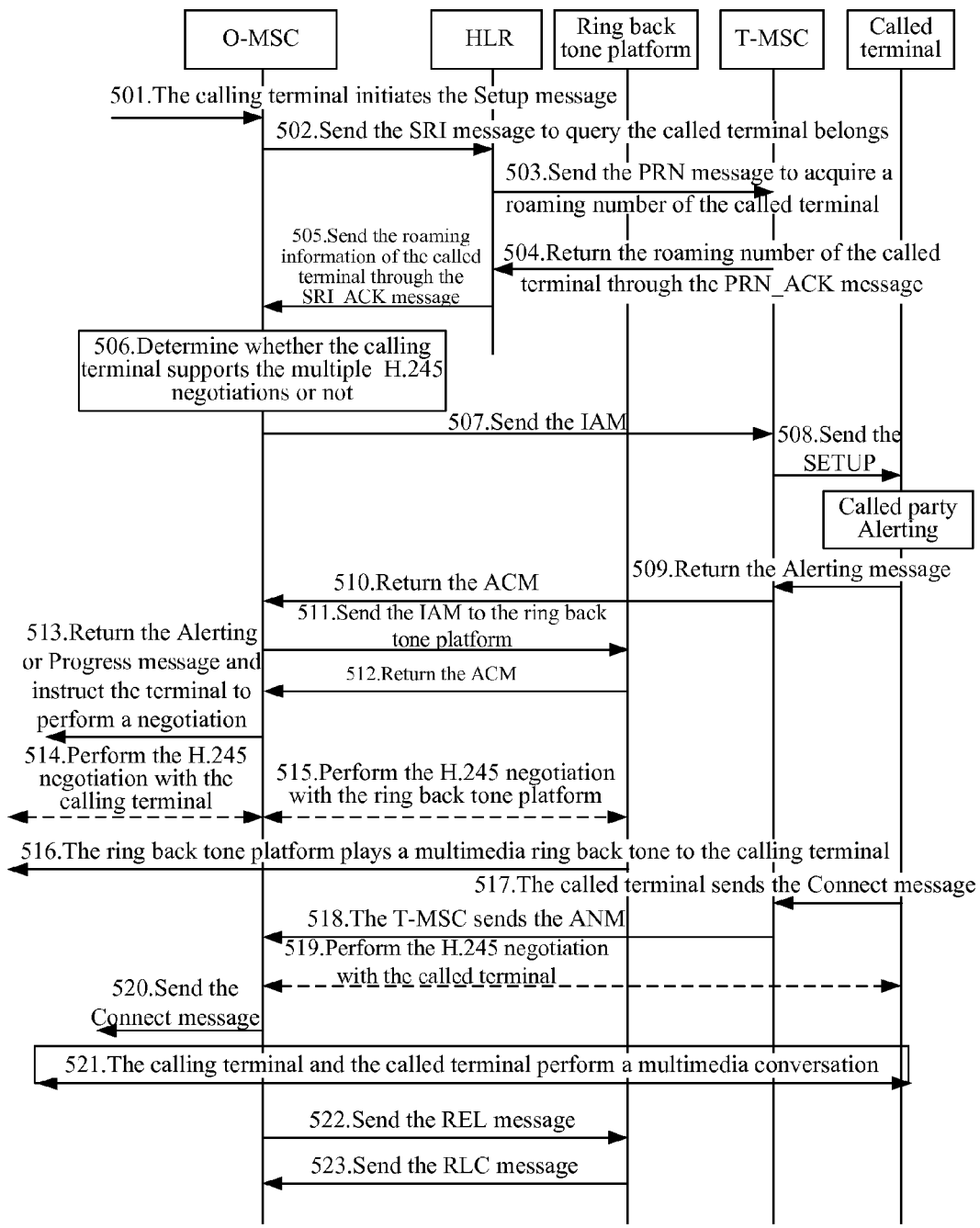
FIG. 7 is a signaling flow chart of a method for realizing a multimedia call according to an embodiment of the disclosure.

In another embodiment of the method of the disclosure, the O-MSC determines whether the calling terminal has the capability of supporting multiple multimedia negotiations or not, and determines, according to an indication of the multimedia negotiation capability of the calling terminal, how to play a ring back tone to the calling terminal. In this embodiment, referring to FIG. 7, the detailed flow of the multimedia call connection is described as follows.

In Step 501, the calling terminal dials a number of the called terminal, and initiates a SETUP message to an O-MSC, in which the SETUP message carries an indication of the multimedia negotiation capability of the calling terminal, and the indication of the multimedia negotiation capability is adapted to identify whether the calling terminal has the capability of supporting multiple H.245 multimedia negotiations or not. The indication of the multimedia negotiation capability may be represented through a spare field in 5a of the BC IE in the SETUP message. In this embodiment, it is assumed that the calling terminal does not support the two H.245 negotiations.

In Step 502, the O-MSC sends an SRI message to an HLR to query current location information of the called terminal.

In Step 503, according to the SRI message received from the O-MSC, the HLR sends a PRN message for acquiring a current roaming number of the called terminal to a T-MSC to which the called terminal belongs.

In Step 504, the T-MSC receives the PRN message from the HLR, and returns a roaming number of the called terminal to the HLR through a PRN_ACK response message.

In Step 505, the HLR sends the roaming information of the called terminal acquired from the T-MSC to the O-MSC through an SRI_ACK response message, and sets an SS_CODE field in the SRI_ACK message to a specific value, in which the specific value indicates that a user of the called terminal activates a multimedia ring back tone service.

In Step 506, the O-MSC determines, according to the SRI_ACK response message, that the called terminal has subscribed the multimedia ring back tone service. The O-MSC determines, according to the factor whether the calling terminal has the capability of supporting multiple H.245 multimedia negotiations or not, a solution for playing a multimedia ring back tone to the calling terminal and a solution for realizing the conversation between the calling terminal and the called terminal. In this embodiment, it is assumed that the calling terminal supports the two H.245 negotiations, and the O-MSC is required for bridging the conversation connection between the calling terminal and the called terminal.

In Step 507, the O-MSC sends an IAM to the T-MSC.

In Step 508, the T-MSC sends the SETUP message to the called terminal.

In Step 509, the called terminal returns an Alerting ringing message to the T-MSC, and the called terminal rings.

In Step 510, the T-MSC returns an ACM to the O-MSC.

In Step 511, the O-MSC sends the IAM to the ring back tone platform, and the IAM carries "Prefix+called MSISDN", in which the Prefix instructs to play a ring back tone to the calling terminal.

In Step 512, the ring back tone platform returns the ACM to the O-MSC, and gets ready to play a multimedia ring back tone. In this step, the ring back tone platform determines, according to information received from the O-MSC, a multimedia ring back tone to be played.

In Step 513, the O-MSC returns the Alerting or Progress message to the calling terminal, so as to instruct the calling terminal to perform the H.245 negotiation.

In Step 514, the calling terminal initiates the H.245 negotiation with the O-MSC.

In Step 515, the O-MSC initiates the H.245 negotiation with the ring back tone platform.

In Step 516, after the multimedia negotiation is completed, the ring back tone platform plays the multimedia ring back tone to the calling terminal.

In Step 517: the called terminal answers the call initiated by the calling terminal, and sends a CONNECT message to the T-MSC.

In Step 518, the T-MSC sends an ANM to the O-MSC, so as to instruct the called terminal to answer the call.

In Step 519, after receiving the ANM message, the O-MSC initiates the H.245 negotiation with the called terminal.

In Step 520, the O-MSC sends the CONNECT message to the calling terminal.

In Step 521, a conversation between the calling terminal and the called terminal is realized.

In Step 522, the O-MSC disconnects the bearer connection with the ring back tone platform, and sends a resource release (REL) message to the ring back tone platform.

In Step 523, after releasing the resource, the ring back tone platform returns a release complete (RLC) message to the O-MSC.

In the above embodiments, for example, the multimedia ring back tone service subscribed to by the user of the called terminal is mainly played, and the embodiments of the disclosure are also applicable to a situation of playing the multimedia ring back tone service subscribed to by the user of the calling terminal.

Through the above descriptions of the implementation manners, those skilled in the art can clearly understand that, the disclosure is realized through combining software with a necessary universal hardware platform, which definitely can be realized through hardware, but in most cases, the former manner is preferred. Based on such understanding, the technical solutions of the disclosure or parts of the technical solutions of the disclosure making contributions to the prior art are substantially presented in the form of a software product. The obtained software product is stored in a storage medium, which includes a plurality of instructions for enabling one computer device (personal computer, server, or network equipment, etc.) to execute the methods according to the embodiments of the disclosure.

Through the technical solution for realizing a multimedia call according to the embodiments of the disclosure, different multimedia call connection solutions can be adopted for terminals having different multimedia negotiation capabilities, so that different terminal users can flexibly and conveniently enjoy the multimedia service, and can flexibly switch the network entity applications, thereby reducing the consumption of the network entities and providing a desirable solution for the converging call connection over networks.

It will be apparent to those skilled in the art that various modifications and variations can be made to the structure of the disclosure without departing from the scope of the invention. In view of the foregoing, it is intended that the disclosure cover modifications and variations of this invention provided they fall within the scope of the following claims and their equivalents.

What is claimed is:

1. A method for realizing a multimedia call, comprising:
   receiving a call request initiated by a calling terminal;
   acquiring an indication of multimedia negotiation capability of the calling terminal;
   determining, according to the indication of the multimedia negotiation capability, whether the calling terminal has a capability of supporting multiple multimedia negotiations or not; and
   determining, according to the multimedia negotiation capability of the calling terminal, whether the calling terminal performs the multiple multimedia negotiations with a ring back tone platform and a called terminal or not, and performing a multimedia call connection.

2. The method according to claim 1, wherein the step of determining, according to the multimedia negotiation capability of the calling terminal, whether the calling terminal performs the multiple multimedia negotiations with the ring back tone platform and a called terminal or not, and performing the multimedia call connection further comprises:
   connecting, by a switching device, a connection to the ring back tone platform when determining, according to the indication of the multimedia negotiation capability, that the calling terminal has the capability of supporting the multiple multimedia negotiations;
   completing, by the calling terminal and the ring back tone platform, a multimedia negotiation between the calling terminal and the ring back tone platform; and
   playing, by the ring back tone platform, a multimedia ring back tone to the calling terminal; and
   releasing the connection with the ring back tone platform after the called terminal answers the call,
   completing, by the calling terminal and the called terminal, a multimedia negotiation between the calling terminal and the called terminal; and
   performing a multimedia conversation.

3. The method according to claim 1, wherein the step of determining, according to the multimedia negotiation capability of the calling terminal, whether the calling terminal performs the multiple multimedia negotiations with the ring back tone platform and the called terminal or not, and performing the multimedia call connection further comprises:
   connecting, by a switching device, a connection to the ring back tone platform when determining, according to the indication of the multimedia negotiation capability, that the calling terminal does not have the capability of supporting the multiple multimedia negotiations;
   completing, by the ring back tone platform and the calling terminal, a multimedia negotiation between the ring back tone platform and the calling terminal;
   playing, by the ring back tone platform, a multimedia ring back tone to the calling terminal;
   completing, by the ring back tone platform and a called terminal, a multimedia negotiation between the ring back tone platform and the calling terminal after the called terminal answers the call; and
   performing, by the calling terminal and the called terminal, a multimedia conversation.

4. The method according to claim 1, wherein the step of determining, according to the multimedia negotiation capability of the calling terminal, whether the calling terminal performs the multiple multimedia negotiations with the ring back tone platform and the called terminal or not, and performing the multimedia call connection further comprises:
   connecting, by a switching device, a connection to the ring back tone platform, when determining, according to the indication of the multimedia negotiation capability, that the calling terminal does not have the capability of supporting the multiple multimedia negotiations;
   completing, by the switching device, a multimedia negotiation with the calling terminal and the ring back tone platform respectively;
   playing, by the ring back tone platform, a multimedia ring back tone to the calling terminal;
   completing, by the switching device and a called terminal, a multimedia negotiation between the switching device and the called terminal after the called terminal answers the call; and
   performing, by the calling terminal and the called terminal, a multimedia conversation.

5. The method according to claim 1, wherein the step of determining, according to the multimedia negotiation capability of the calling terminal, whether the calling terminal performs the multiple multimedia negotiations with the ring back tone platform and the called terminal or not, and performing the multimedia call connection further comprises:
   connecting, by a switching device, a connection to the called terminal when determining, according to the indication of the multimedia negotiation capability, that the calling terminal does not have the capability of supporting the multiple multimedia negotiations; and
   completing, by the calling terminal and the called terminal, a multimedia negotiation after the called terminal answers the call, and performing, by the calling terminal and the called terminal, a multimedia conversation.

6. The method according to claim 1, wherein the switching device is an originating mobile switching center (O-MSC), a terminating mobile switching center (T-MSC), or a gateway mobile switching center (GMSC).

7. The method according to claim 1, wherein the call request comprises the indication of the multimedia negotiation capability of the calling terminal; and
   the step of acquiring the indication of the multimedia negotiation capability of the calling terminal further comprises extracting the indication of the multimedia negotiation capability from the call request.

8. The method according to claim 5, further comprising: playing, by the calling terminal, a multimedia ring back tone before the called terminal answers the call.

9. An apparatus for realizing a multimedia call, comprising:
- a receiving unit, adapted to receive a call request initiated by a calling terminal;
- an acquiring unit, adapted to acquire an indication of multimedia negotiation capability of the calling terminal;
- a determining unit, adapted to determine, according to the indication of the multimedia negotiation capability, whether the calling terminal has a capability of supporting multiple multimedia negotiations or not; and
- an operating unit, adapted to determine, according to the multimedia negotiation capability of the calling terminal, whether the calling terminal performs the multiple multimedia negotiations with a ring back tone platform and a called terminal or not; and perform a multimedia call connection.

10. The apparatus according to claim 9, wherein the operating unit further comprises:
- a first operating unit, adapted to, when the determining unit determines that the calling terminal has the capability of supporting multiple multimedia negotiations, connect to the ring back tone platform, to enable the ring back tone platform and the calling terminal to complete a multimedia negotiation between the ring back tone platform and the calling terminal, wherein the ring back tone platform plays a multimedia ring back tone to the calling terminal; the calling terminal releases the connection with the ring back tone platform after the called terminal answers the call, the calling terminal and the called terminal completes a multimedia negotiation between the calling terminal and the called terminal to enable the calling terminal and the called terminal to perform a multimedia conversation.

11. The apparatus according to claim 9, wherein the operating unit further comprises:
- a second operating unit, adapted to, when the determining unit determines that the calling terminal does not have the capability of supporting multiple multimedia negotiations, connect the ring back tone platform to enable the ring back tone platform and the calling terminal to complete a multimedia negotiation, wherein the ring back tone platform plays a multimedia ring back tone to the calling terminal, and the ring back tone platform and the called terminal complete a multimedia negotiation between the ring back tone platform and a called terminal after the called terminal answers the call to enable the calling terminal and the called terminal to perform a multimedia conversation.

12. The apparatus according to claim 9, wherein the operating unit further comprises:
- a third operating unit, adapted to, when the determining unit determines that the calling terminal does not have the capability of supporting multiple multimedia negotiations, connect the ring back tone platform, complete a multimedia negotiation with the calling terminal and the ring back tone platform respectively to enable the ring back tone platform to play a multimedia ring back tone to the calling terminal, complete a multimedia negotiation between the third operating unit and the called terminal after the called terminal answers the call to enable the calling terminal and the called terminal to perform a multimedia conversation, and release the connection with the ring back tone platform.

13. The apparatus according to claim 9, wherein the operating unit further comprises:
- a fourth operating unit, adapted to, when the determining unit determines that the calling terminal does not have the capability of supporting multiple multimedia negotiations, connect to the called terminal to enable the calling terminal and the called terminal to complete a multimedia negotiation and enable the calling terminal and the called terminal to perform a multimedia conversation.

14. The apparatus according to claim 9, further comprising: a storage unit adapted to store the indication of the multimedia negotiation capability of the calling terminal;
- wherein the acquiring unit is adapted to acquire the indication of the multimedia negotiation capability of the calling terminal from the storage unit.

15. The apparatus according to claim 9, wherein the apparatus is set in an originating mobile switching center (O-MSC), a terminating mobile switching center (T-MSC), or a gateway mobile switching center (GMSC).

16. A system for realizing a multimedia call, comprising:
- a switching device adapted to receive a call request initiated by a calling terminal, acquire an indication of multimedia negotiation capability of the calling terminal, determine, according to the indication of the multimedia negotiation capability, whether the calling terminal has the capability of supporting multiple multimedia negotiations or not, and determine, according to the multimedia negotiation capability of the calling terminal, whether the calling terminal performs the multiple multimedia negotiations with a ring back tone platform and a called terminal or not, and perform a multimedia call connection; and wherein the switching device realizes the multimedia call connection by setting up a connection between the calling terminal and the called terminal.

17. The system according to claim 16, wherein when determining, according to the indication of the multimedia negotiation capability, that the calling terminal has the capability of supporting the multiple multimedia negotiations, the switching device connects to the ring back tone platform;
- the ring back tone platform is adapted to perform a multimedia negotiation with the calling terminal, and play a multimedia ring back tone to the calling terminal; and
- after the called terminal answers the call, the switching device releases the connection with the ring back tone platform, the calling terminal and the called terminal complete a multimedia negotiation between the calling terminal and the called terminal, and the calling terminal and the called terminal perform the multimedia conversation.

18. The system according to claim 16, wherein when determining, according to the indication of the multimedia negotiation capability, that the calling terminal does not have the capability of supporting multiple multimedia negotiations, the switching device connects to the ring back tone platform; and
- the ring back tone platform is adapted to perform a multimedia negotiation with the calling terminal, play a multimedia ring back tone to the calling terminal, and perform a multimedia negotiation between the ring back tone platform and the called terminal after the called terminal answers the call, so that the calling terminal and the called terminal perform a multimedia conversation.

19. The system according to claim 16, wherein when determining, according to the indication of the multimedia negotiation capability, that the calling terminal does not have the capability of supporting the multiple multimedia negotiations, the switching device connects to the ring back tone platform, and completes a multimedia negotiation with the calling terminal and the ring back tone platform respectively;

the ring back tone platform is adapted to perform a multimedia negotiation with the switching device, and play a multimedia ring back tone to the calling terminal; and after the called terminal answers the call, the switching device performs a multimedia negotiation between the switching device and the called terminal, releases the connection with the ring back tone platform, and enables the calling terminal and the called terminal to perform a multimedia conversation.

20. The system according to claim 16, wherein
the switching device further connects to the called terminal;
the calling terminal and the called terminal complete a multimedia negotiation after the called terminal answers the call; and
the calling terminal and the called terminal perform a multimedia conversation, when the switching device determines, according to the indication of the multimedia negotiation capability, that the calling terminal does not have the capability of supporting the multiple multimedia negotiations.

* * * * *